United States Patent
Liang

(10) Patent No.: US 12,445,625 B2
(45) Date of Patent: Oct. 14, 2025

(54) CODING VIDEO FRAME KEY POINTS TO ENABLE RECONSTRUCTION OF VIDEO FRAME

(71) Applicant: Tencent Technology (Shenzhen) Company Limited, Guangdong (CN)

(72) Inventor: Yuxuan Liang, Shenzhen (CN)

(73) Assignee: TENCENT TECHNOLOGY (SHENZHEN) COMPANY LIMITED, Nagaokakyo (JP)

( * ) Notice: Subject to any disclaimer, the term of this patent is extended or adjusted under 35 U.S.C. 154(b) by 28 days.

(21) Appl. No.: 18/198,628

(22) Filed: May 17, 2023

(65) Prior Publication Data
US 2023/0291909 A1    Sep. 14, 2023

Related U.S. Application Data

(63) Continuation of application No. PCT/CN2022/104506, filed on Jul. 8, 2022.

(30) Foreign Application Priority Data

Aug. 12, 2021    (CN) .......................... 202110926679.7

(51) Int. Cl.
H04N 11/02    (2006.01)
G06T 7/246    (2017.01)
(Continued)

(52) U.S. Cl.
CPC ........... *H04N 19/137* (2014.11); *G06T 7/248* (2017.01); *G06T 7/73* (2017.01); *G06V 10/761* (2022.01);
(Continued)

(58) Field of Classification Search
CPC .................................................. H04N 19/137
(Continued)

(56) References Cited

U.S. PATENT DOCUMENTS

| 6,526,173 B1 * | 2/2003 | Burns | H04N 19/577 |
| | | | 375/E7.184 |
| 8,373,802 B1 * | 2/2013 | Gross | G11B 27/034 |
| | | | 348/700 |

(Continued)

FOREIGN PATENT DOCUMENTS

| CN | 104618721 A | 5/2015 |
| CN | 113132727 A | 7/2021 |
| CN | 114363623 A | 4/2022 |

OTHER PUBLICATIONS

International Search Report and Written Opinion received for PCT Patent Application No. PCT/CN2022/104506, mailed on Sep. 29, 2022, 11 pages (official copy only).

(Continued)

*Primary Examiner* — Leron Beck
(74) *Attorney, Agent, or Firm* — ARENTFOX SCHIFF LLP

(57) ABSTRACT

An image processing method includes receiving coded image data of a video clip transmitted by an encoder, and decoding the coded image data to obtain a first video frame, key points in the first video frame, and key points in a second video frame not included in the coded image data received from the encoder. The key points represent positions of an object in the first and second video frames. The method further includes generating transforming information of motion of the object according to the key points in the first video frame and the key points in the second video frame, and reconstructing the second video frame according to the first video frame and the transforming information.

20 Claims, 10 Drawing Sheets

(51) Int. Cl.
*G06T 7/73* (2017.01)
*G06V 10/74* (2022.01)
*G06V 10/776* (2022.01)
*G06V 10/82* (2022.01)
*G06V 20/40* (2022.01)
*H04N 19/132* (2014.01)
*H04N 19/137* (2014.01)
*H04N 19/17* (2014.01)
*H04N 19/182* (2014.01)
*H04N 19/46* (2014.01)
*H04N 19/60* (2014.01)

(52) U.S. Cl.
CPC ............ *G06V 10/776* (2022.01); *G06V 10/82* (2022.01); *G06V 20/41* (2022.01); *G06V 20/46* (2022.01); *H04N 19/132* (2014.11); *H04N 19/17* (2014.11); *H04N 19/182* (2014.11); *H04N 19/46* (2014.11); *H04N 19/60* (2014.11); *G06T 2207/10016* (2013.01); *G06T 2207/20081* (2013.01)

(58) Field of Classification Search
USPC ........................................ 375/240.01–240.29
See application file for complete search history.

(56) References Cited

U.S. PATENT DOCUMENTS

| | | | | |
|---|---|---|---|---|
| 10,021,395 | B2* | 7/2018 | Ozerov | H04N 19/184 |
| 10,600,334 | B1* | 3/2020 | Zhang | G06N 3/08 |
| 10,867,380 | B1* | 12/2020 | Pathan | G06F 16/9035 |
| 2006/0088191 | A1* | 4/2006 | Zhang | G06V 20/40 |
| | | | | 382/103 |
| 2010/0239123 | A1* | 9/2010 | Funayama | G06T 7/251 |
| | | | | 382/173 |
| 2012/0183224 | A1* | 7/2012 | Kirsch | G06T 7/00 |
| | | | | 382/224 |
| 2013/0027775 | A1* | 1/2013 | Zuniga | G02B 27/646 |
| | | | | 359/554 |
| 2013/0202213 | A1* | 8/2013 | Adamek | G06F 16/532 |
| | | | | 382/201 |
| 2015/0036939 | A1* | 2/2015 | Cordara | H04N 19/129 |
| | | | | 382/201 |
| 2019/0130602 | A1* | 5/2019 | Hall | G06T 7/74 |
| 2019/0279338 | A1* | 9/2019 | Bergen | G06V 10/507 |
| 2019/0311202 | A1* | 10/2019 | Lee | G06T 9/002 |
| 2020/0051254 | A1* | 2/2020 | Habibian | G06T 7/75 |
| 2020/0250807 | A1* | 8/2020 | Hong | G06T 7/11 |
| 2020/0341466 | A1* | 10/2020 | Pham | G06V 10/454 |
| 2020/0387704 | A1* | 12/2020 | Ng | G06V 10/44 |
| 2022/0067950 | A1* | 3/2022 | Lv | G06N 3/08 |
| 2022/0103860 | A1 | 3/2022 | Demyanov | |
| 2023/0093621 | A1* | 3/2023 | Wu | G06F 16/9538 |
| | | | | 707/722 |

OTHER PUBLICATIONS

Konuko et al., "Ultra-Low Bitrate Video Conferencing Using Deep Image Animation", ICASSP 2021—2021 IEEE International Conference on acoustics, speech and signal Processing (ICASSP), IEEE, XP033955596, Jun. 6, 2021, pp. 4210-4214.

Partial Supplementary European Search Report and Search Opinion received for European Application 22855138.8, mailed on Oct. 30, 2024, 18 pages.

Siarohin et al., "Animating Arbitrary Objects via Deep Motion Transfer", arxiv.org, Cornell university library, 201 Olin library Cornell university Ithaca, NY 14853, XP081488685, Dec. 20, 2018, 21 pages.

Siarohin et al., "First Order Motion Model for Image Animation", arxiv.org, Cornell university library, 201 Olin library Cornell university Ithaca, NY 14853, XP081775282, Oct. 1, 2020, 20 pages.

Wang et al., "One-Shot Free-View Neural Talking-Head Synthesis for Video Conferencing", arxiv.org, Cornell university library, 201 Olin library Cornell university Ithaca, NY 14853, v3, XP081927463, Apr. 2, 2021, 16 pages.

* cited by examiner

CODING VIDEO FRAME KEY POINTS TO ENABLE RECONSTRUCTION OF VIDEO FRAME

RELATED APPLICATIONS

This application is a continuation of International Application No. PCT/CN2022/104506, entitled "IMAGE PROCESSING METHOD AND APPARATUS, MEDIUM, AND ELECTRONIC DEVICE" and filed on Jul. 8, 2022, which claims priority to Chinese Patent Application No. 202110926679.7 filed on Aug. 12, 2021, and entitled "IMAGE PROCESSING METHOD AND APPARATUS, MEDIUM AND ELECTRONIC DEVICE." The entire disclosures of the prior applications are hereby incorporated by reference in their entirety.

FIELD OF THE TECHNOLOGY

This application relates to the technical field of artificial intelligence, including an image processing method, an image processing apparatus, a computer readable medium, and an electronic device.

BACKGROUND OF THE DISCLOSURE

In the process of video coding transmission, there is generally transmission of pixel-level frame residual information by means of accurate pixel point rendering and using a technology based on predictive coding. Although video compression performance can be improved with continuous evolution of traditional video coding standards, a signal compression mode based on two-dimensional pixel values has a problem of high information density of data transmission, and difficulty in achieving an order of magnitude improvement in bit rate while ensuring high-definition video quality.

SUMMARY

The purpose of this disclosure is to provide an image processing method, an image processing apparatus, a computer readable medium, and an electronic device, to overcome technical problems existing in the prior art to at least a certain degree, such as large data transmission amount and high transmission code rate.

In an embodiment, an image processing method includes receiving coded image data of a video clip transmitted by an encoder, and decoding the coded image data to obtain a first video frame, key points in the first video frame, and key points in a second video frame not included in the coded image data received from the encoder. The key points represent positions of an object in the first and second video frames. The method further includes generating transforming information of motion of the object according to the key points in the first video frame and the key points in the second video frame, and reconstructing the second video frame according to the first video frame and the transforming information.

In an embodiment, an image processing method includes obtaining a video clip to be transmitted, the video clip including multiple video frames, and extracting from the video clip a first video frame including an object and a second video frame including the object. The method further includes performing key point detection on the first video frame and the second video frame, to obtain key points of the object in the first video frame and the second video frame. The key points represent positions of the object in the first and second video frame. The method further includes encoding the first video frame, the key points in the first video frame, and the key points in the second video frame to obtain coded image data that does not include the second video frame, and transmitting the coded image data to a decoder configured to reconstruct the second video frame according to the coded image data.

In an embodiment, an image processing apparatus includes processing circuitry configured to receive coded image data of a video clip transmitted by an encoder, and decode the coded image data to obtain a first video frame, key points in the first video frame, and key points in a second video frame not included in the received coded image data. The key points represent positions of an object in the first and second video frames. The processing circuitry is further configured to generate transforming information of motion of the object according to the key points in the first video frame and the key points in the second video frame, and reconstruct the second video frame according to the first video frame and the transforming information.

In the technical solutions provided by the embodiments of this disclosure, coding key points representing an extremely small information amount as compared to the full video frame image can enable reconstruction of the video frame image based on the key points, and can improve the coding, decoding, and transmitting efficiencies of the video image while lowering the data amount and the transmitting code rate.

It should be understood that the above general description and the following detailed description are only exemplary and explanatory, and cannot limit this disclosure.

BRIEF DESCRIPTION OF THE DRAWINGS

The accompanying drawings, which are incorporated herein and constitute a part of the specification, illustrate embodiments consistent with this disclosure and, together with the specification, serve to explain the principles of the embodiments of this disclosure. The accompanying drawings in the following description show merely some embodiments of this disclosure, and a person of ordinary skill in the art may obtain other accompanying drawings from these accompanying drawings.

DESCRIPTION OF EMBODIMENTS

Exemplary implementations will now be described more thoroughly with reference to the accompanying drawings. However, the examples of implementations may be implemented in multiple forms, and it is not to be understood as being limited to the examples described herein. On the contrary, providing these implementations enables this disclosure to be more comprehensive and complete and the conception of the exemplary implementations are comprehensively delivered to a person skilled in the art.

In addition, the described features, structures or characteristics may be combined in one or more embodiments in any appropriate manner. In the following descriptions, a lot of specific details are provided to give a comprehensive understanding of the embodiments of this disclosure. However, a person of ordinary skill in the art is to be aware that, the technical solutions in this disclosure may be implemented without one or more of the particular details, or another method, unit, apparatus, or step may be used. In other cases, well-known methods, apparatuses, implementations, or operations are not shown or described in detail, in order not to obscure the aspects of this disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
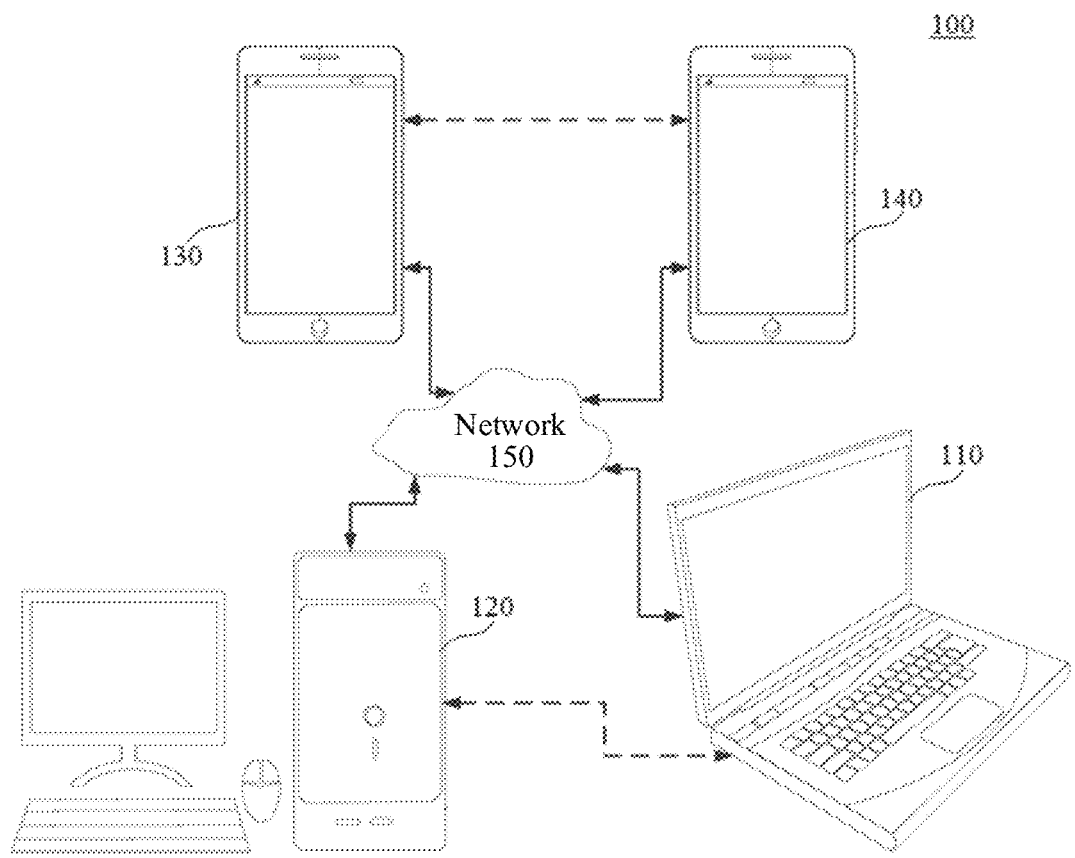
FIG. 1 shows a schematic diagram of an exemplary system architecture that a technical solution of an embodiment of this disclosure can be applied.

FIG. 1 shows a schematic diagram of an exemplary system architecture that a technical solution of an embodiment of this disclosure can be applied.

As shown in FIG. 1, the system architecture 100 includes multiple terminal apparatuses. The terminal apparatuses may communicate with each other through, for example, a network 150. For example, the system architecture 100 may include a first terminal apparatus 110 and a second terminal apparatus 120 interconnected with each other through the network 150. In the embodiment in FIG. 1, the first terminal apparatus 110 and the second terminal apparatus 120 execute unidirectional data transmission.

For example, the first terminal apparatus 110 can encode video data (such as a video picture stream collected by the terminal apparatus 110) to be transmitted through the network 150 to the second terminal apparatus 120. The coded video data is transmitted in a form of one or more coded video streams. The second terminal apparatus 120 can receive the coded video data from the network 150. The coded video data is decoded to recover the video data, and a video picture is displayed according to the recovered video data.

In an embodiment of this disclosure, the system architecture 100 may include a third terminal apparatus 130 and a fourth terminal apparatus 140 performing a two-way transmission of the coded video data; the two-way transmission may, for example, take place during a video conference. For the two-way data transmission, either terminal apparatus in the third terminal apparatus 130 and the fourth terminal apparatus 140 may encode the video data (e.g., the video picture stream collected by the terminal device) for transmission through the network 150 to the other terminal apparatus in the third terminal apparatus 130 and the fourth terminal apparatus 140. Either terminal apparatus of the third terminal apparatus 130 and the fourth terminal apparatus 140 may also receive coded video data transmitted by the other terminal apparatus of the third terminal apparatus 130 and the fourth terminal apparatus 140, and may decode the coded video data to recover the video data and display the video picture on an accessible display apparatus based on the recovered video data.

In the embodiment of FIG. 1, the first terminal apparatus 110, the second terminal apparatus 120, the third terminal apparatus 130, and the fourth terminal apparatus 140 may be servers, personal computers, and smart phones, but the principles disclosed in this disclosure are not limited thereto. The embodiments disclosed in this disclosure are adapted to laptop computers, tablets, media players, and/or dedicated video conference devices. Each terminal apparatus in the embodiments of this disclosure can be used as a blockchain node to form a blockchain network, and the coded data transmitted among each terminal apparatus can be saved on the blockchain maintained by the blockchain network. The network 150 represents any number of networks that include, for example, wired and/or wireless communication networks, and transmit the coded video data among the first terminal apparatus 110, the second terminal apparatus 120, the third terminal apparatus 130, and the fourth terminal apparatus 140. The communication network 150 can exchange data in circuit switched and/or packet switched channels. The network may include telecommunications networks, local area networks, wide area networks, and/or the Internet. For the purposes of this disclosure, unless explained below, the architecture and topology of the network 150 may be immaterial to operations disclosed in this disclosure.

Figure 2:
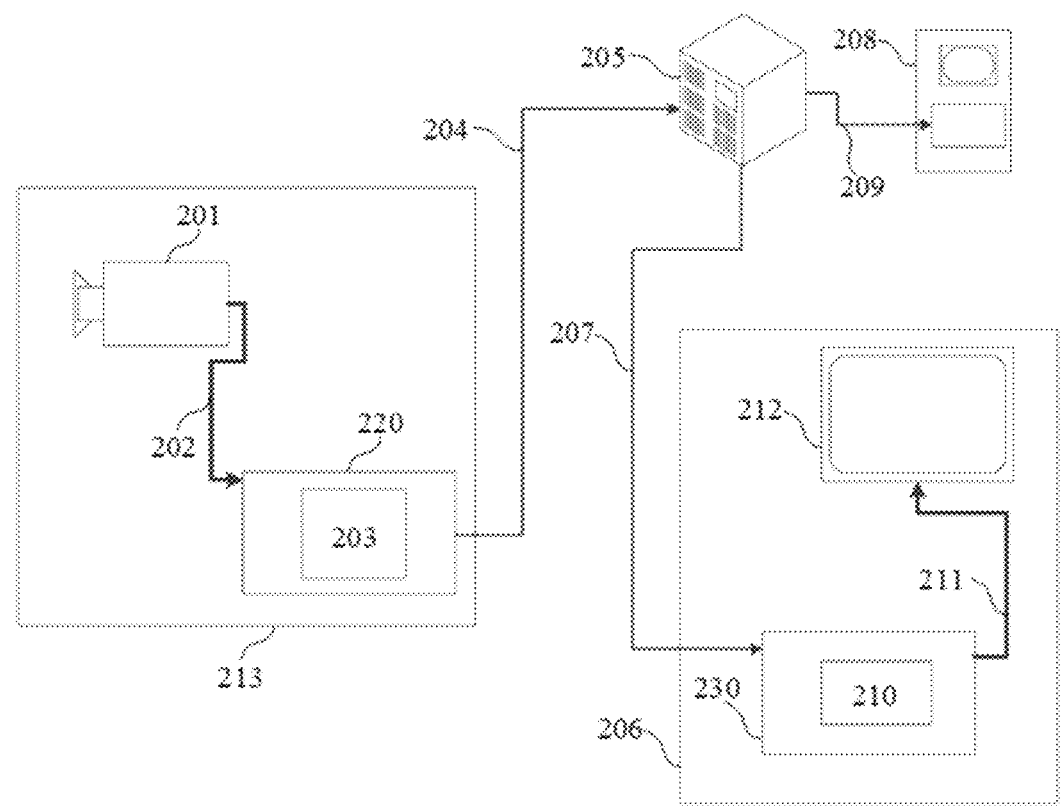
FIG. 2 shows a placement mode of a video coding apparatus and a video decoding apparatus in a streaming transmission environment.

In an embodiment of this disclosure, FIG. 2 shows a placement mode of a video coding apparatus and a video decoding apparatus in a streaming transmission environment. The subject matter disclosed in this disclosure may be equally applicable to other video-supported applications, including, for example, video conference, digital television (TV), storage of compressed videos on digital media including CDs, DVDs, memory sticks, etc.

The streaming transmission system can include a collection subsystem 213; the collection subsystem 213 can include a digital camera and other video sources 201; the video source creates a uncompressed video picture stream 202. In an embodiment, the video picture stream 202 includes a sample photographed by the digital camera. As compared with the coded video data 204 (or the coded video code stream 204), the video picture stream 202 is depicted as thick lines to emphasize the video picture stream of a high data amount; the video picture stream 202 can be processed by an electronic apparatus 220. The electronic apparatus 220 includes a video coding apparatus 203 coupled to the video source 201. The video coding apparatus 203 may include hardware, software, or a combination of software and hardware to implement or execute each aspect of the subject matter disclosed as described below in detail. As compared with the video picture stream 202, the coded video data 204 (or the coded video code stream 204) is depicted as thin lines to emphasize the coded video data 204 (or the coded video code stream 204) with a relatively low data amount, which can be stored on the streaming transmission server 205 for the future usage. One or more streaming transmission client subsystems, for example, a client subsystem 206 and a client subsystem 208 in FIG. 2, can access the streaming transmission server 205 to retrieve a copy 207 and a copy 209 of the coded video data 204. The client subsystem 206 may include a video decoding apparatus 210 of the electronic apparatus 230. The video decoding apparatus 210 decodes the transmitted copy 207 of the coded video data, and generates an output video picture stream 211 that can be presented on a display 212 (for example, a display screen) or another presenting apparatus. In some streaming transmission system, the coded video data 204, video data 207, and video data 209 (for example, the video code stream) can be coded according to certain video coding/compression standards thereof. An Embodiment of these standards includes ITU-T H.265. In the embodiment, the video codec standard being developed is informally known as Versatile Video Coding (VVC) and this disclosure can be used in the context of the VVC standard.

It should be noted that the electronic apparatus 220 and the electronic apparatus 230 may include other assemblies that are not shown in the drawings. For instance, the electronic apparatus 220 may include a video decoding apparatus, and the electronic apparatus 230 may also include a video coding apparatus.

In one embodiment of this disclosure, taking international video codec standards High Efficiency Video Coding (HEVC), Versatile Video Coding (VVC), and China's National Video Codec Standard AVS as an example, after inputting a video frame image, according to a block size, the video frame image would be divided into several non-overlapping processing units, each of which would perform a similar compression operation. The processing unit is referred to as a Coding Tree Unit (CTU), or a Largest Coding Unit (LCU). Furthermore, CTU can be further divided more finely, to obtain one or more basic coding units (CU). The CU is the most basic element in a coding link. Some concepts during coding the CU are introduced as follows:

Predictive Coding: Predictive Coding includes intra-frame prediction, inter-frame prediction, and other modes; after an original video signal is predicted by the selected reconstructed video signal, a residual video signal is obtained. The coding end needs to decide to select which predictive coding mode for the current CU and inform the decoding end. The Intra-frame prediction means that the predicted signal comes from the coded and reconstructed region in a same image. The Inter-frame prediction means that the predicted signal comes from other images (referred to as reference images) that have been coded and are different from the current image.

Transform & Quantization: After Discrete Fourier Transform (DFT), Discrete Cosine Transform (DCT) and other transformation operations on the residual video signal, the signal is converted into the transform domain, referred to as the transformation coefficient. The transformation coefficient further carries out a lossy quantization operation, and loses certain information, so that the quantized signal is conducive to compressed expression. In some video coding standards, there may be more than one transformation mode to choose, so the coding end also needs to select one of the transformation modes for the current CU and inform the decoding end. The precision degree of quantization is usually determined by the Quantization Parameter (QP for short). A relatively large value of QP indicates that the coefficients in a larger value range would be quantized into a same output, and therefore, it would usually lead to greater distortion and lower bit rate. On the contrary, a relatively small value of QP means that the coefficients in a smaller value range would be quantized into the same output, and therefore, it would usually lead to less distortion and correspond to a relatively high bit rate at the same time.

Entropy Coding or Statistical Coding: The quantized transform domain signal would be statistically compressed and coded according to the frequency of appearances of each value, and finally the compressed code stream of binarization (0 or 1) is output. At the same time, other information generated by coding, such as the selected coding mode and motion vector data, also needs entropy coding to reduce the bit rate. Statistical Coding is a lossless coding mode, which can effectively reduce the code rate required to express the same signal. Common Statistical Coding includes Variable Length Coding (VLC for short) or Content Adaptive Binary Arithmetic Coding (CABAC for short).

The Context-Based Adaptive Binary Arithmetic Coding (CABAC) process mainly includes three steps: binarization, context modeling, and binary arithmetic coding. After binarizing the input syntax element, the binary data can be coded using a conventional coding mode or a bypass coding mode. In the bypass coding mode, there is no need to assign a specific probability model to each binary bit. The input binary bin value is directly coded by a simple bypass coder to speed up an overall coding and decoding speed. In general, different syntax elements are not completely independent from each other, and the same syntax elements themselves also have certain memorability. Therefore, according to a conditional entropy theory, conditional coding using other coded syntax elements can further improve the coding performance with respect to independent coding or memory-free coding. The use of coded information as conditions is referred to as context. In the conventional coding mode, the binary bits of the syntax element enter the context coder sequentially. The coder assigns a suitable probability model to each input binary bit according to the value of the previously coded syntax element or binary bit. This process is referred to as context modeling. The context model corresponding to the syntax element can be located through Context Index Increment (ctxIdxInc) and Context Index Start (ctxIdxStart). After both the bin value and the assigned probability model are sent to the binary arithmetic coder for coding, the context model needs to be updated according to the bin value, i.e., the adaptive process during coding.

Loop Filtering: The reconstruction image of the transformed and quantized signal is obtained through the operations of inverse quantization, inverse transformation, and prediction compensation. Upon comparison, some information of the reconstruction image is different from that of the original image due to the quantization influence, that is, the reconstruction image would produce distortion. Therefore, filtering operations can be performed on the reconstruction images, such as Deblocking filter (DB for short), Sample Adaptive Offset (SAO), or Adaptive Loop Filter (ALF), which can effectively reduce the degree of distortion caused by quantization. Since these reconstruction images after filtering would be used as reference for subsequent coded images to predict future image signals, the filtering operation above is also called loop filtering, that is, a filtering operation within the coding loop.

Figure 3:
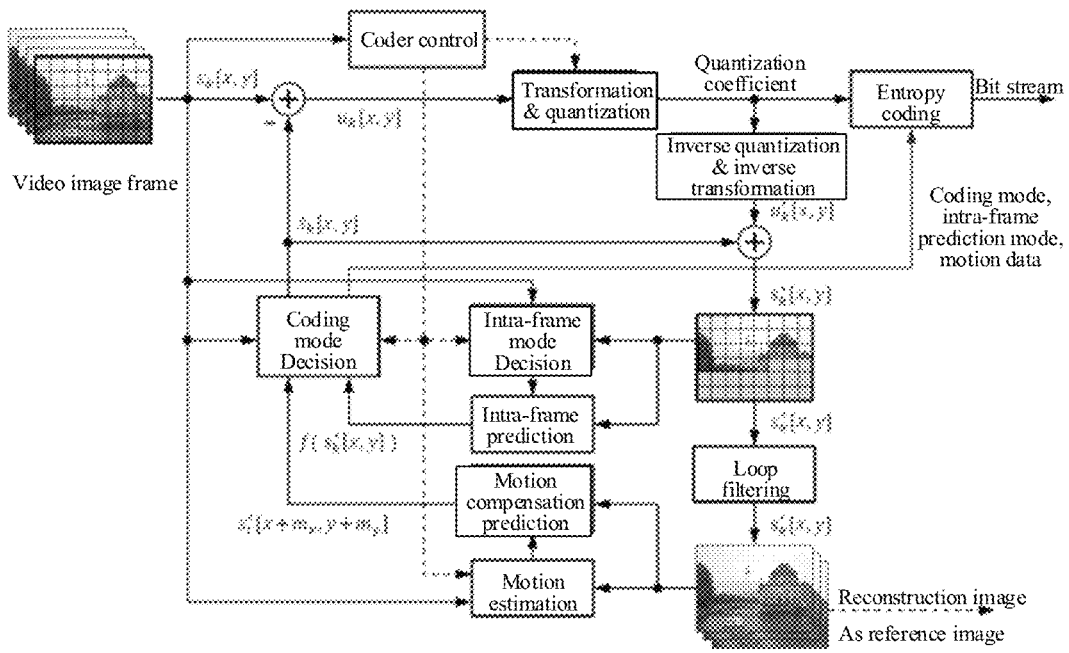
FIG. 3 shows a basic flowchart of a video coder.

In an embodiment of this disclosure, FIG. 3 shows a basic flowchart of a video coder. In this process, intra-frame prediction is taken as an example for illustration. A residual signal $u_k[x,y]$ is obtained by a difference operation between an original image signal $s_k[x,y]$ and a predicted image signal $ŝ_k[x,y]$, and a quantization coefficient is obtained after transform and quantization processing on the residual signal $u_k[x,y]$. On one hand, a coded bit stream is obtained by entropy coding of the quantization coefficient, and on the other hand, a reconstructed residual signal $u'_k[x,y]$ obtained by inverse quantization and inverse transform processing; the predicted image signal $ŝ_k[x,y]$ and the reconstructed residual signal $u'_k[x,y]$ are superimposed to generate an image signal $s_k1*[x,y]$. On one hand, the image signal $s_k*[x,y]$ is input to an intra-frame mode decision module and an intra-frame prediction module for intra-frame prediction processing, and on the other hand, the reconstructed image signal $s'_k[x,y]$ is output through loop filtering. The reconstructed image signal $s'_k[x,y]$ can be used as a reference image of a next frame for motion estimation and motion compensation prediction. Then, a predicted image signal $ŝ_k[x,y]$ of the next frame is obtained based on a motion compensation prediction result $s'_r[x+m_x,y+m_y]$ and an intra-frame prediction result $f(s_k*[x,y])$, and the above-mentioned process is repeated until coding is completed.

Based on the coding process above, entropy decoding is performed on each CU at the decoding end after obtaining the compression code stream (i.e., the bit stream) to obtain each mode information and quantization coefficient. Then the quantization coefficient is processed by inverse quantization and inverse transformation to obtain the residual signal. On the other hand, according to the known coding pattern information, the predicted signal corresponding to the CU can be obtained. Then, after adding the residual signal and the predicted signal, the reconstructed signal can be obtained. After loop filtering and other operations on the reconstructed signal, the final output signal can be generated.

One application scene of the embodiments of this disclosure may include a video consulting service, which is a network communication service for enterprise end users; the users may conduct real-time communications between two or more people through terminal devices installed with instant messaging software. In addition, the embodiments of this disclosure can also be applied to video calls, network broadcast, and other scenes involving video transmission, and the embodiments of this disclosure do not make any special restrictions.

The embodiments of this disclosure can improve the image definition problem in video transmission based on Artificial Intelligence (AI) technology, solve the problems such as fuzzy video and poor experience in a state of poor network, and has advantages of cross-terminal, high security, high degree of imitation, fast generation speed, strong real-time, etc.

Figure 4:
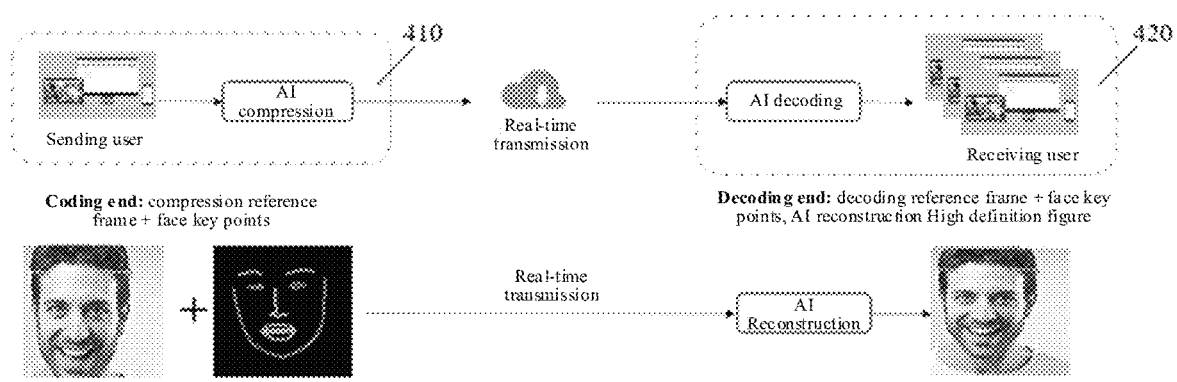
FIG. 4 exemplarily shows a principle block diagram of an embodiment of this disclosure in video consulting or other application scenes involving video transmission.

FIG. 4 exemplarily shows a principle block diagram of an embodiment of this disclosure in video consulting or other application scenes involving video transmission. As shown in FIG. 4, a sending user at the coding end 410 can collect a video image containing a face through the image collection device such as a camera, and further conduct face recognition on the video image through an AI coding model to obtain the included face key points. On this basis, the AI coding model can compress and code key frames and face key points in each video image frame to obtain corresponding image coding data. After the image coding data is transmitted to the decoding end 420 in real time, the AI decoding module located at the decoding end 420 can carry out face reconstruction according to the reference frame and the face key points of each video image frame, to obtain the face reconstruction image with relatively high definition, so as to present clear and continuous video images to the receiving user. The technical solution provided by the embodiments of this disclosure can code only the semantic key points with an extremely small information amount through the encoding end, and reconstruct and restore the high definition (HD) face image accordingly after receiving the key points at the decoding end. Compared with the traditional video transmission solution, this disclosure can well overcome problems such as low timeliness of video transmission, unnatural images, and fuzzy images.

The following are detailed descriptions of the technical solutions of the image processing methods provided by the embodiments of this disclosure from two parts, i.e., the coding end and decoding end, respectively.

Figure 5:
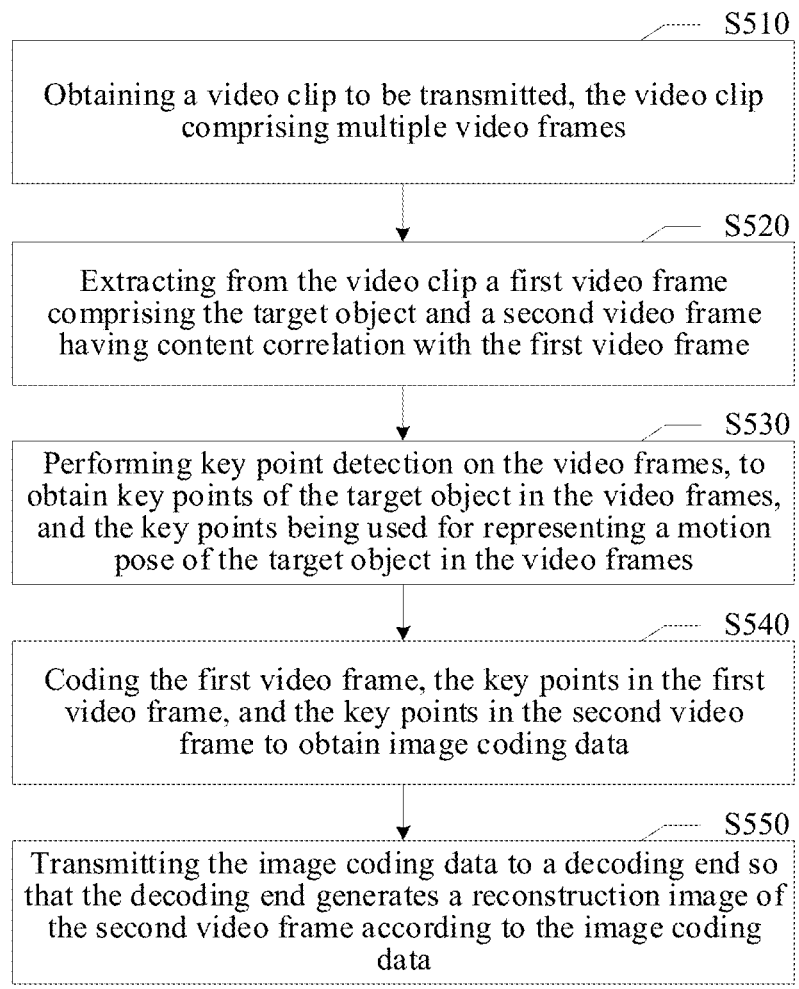
FIG. 5 exemplarily shows a flowchart of steps of an image processing method in an embodiment of this disclosure.

FIG. 5 exemplarily shows a flowchart of steps of an image processing method in an embodiment of this disclosure. The image processing method can be executed by the video coder shown in FIG. 3. As shown in FIG. 5, the image processing method may include the following steps S510-S550.

In step S510, a video clip to be transmitted is obtained, and the video clip includes multiple video frames.

In one embodiment of this disclosure, the video clip may be a video with a video section with a specified length of time that is collected in real time by an image collection device, and the video clip may also be a clip clipped from a collected complete video.

The video clip includes multiple video frames; one video frame is a video image. For example, the length of time of the video clip is 2 seconds, and a frame rate thereof is 60 frame per second, and therefore, the video clip includes 120 continuous video frames.

In step S520, from the video clip a first video frame including the target object and a second video frame having content correlation with the first video frame are extracted. For example, a first video frame including an object and a second video frame including the object are extracted from the video clip. In the present disclosure, the terms "target object" and "object" are used interchangeably. Likewise, the terms "target object recognition model" and "object recognition model" are also used interchangeably.

Content correlation refers to that the first video frame and the second video frame have similar video contents. For example, the first video frame and the second video frame both include the same target object and the target object has similar action poses.

In an embodiment of this disclosure, the target object may be a face; the first video frame may be a key frame including the face; the second video frame may be one or more video frames continuous in time with the first video frame and having similar contents.

The video clip may include one or more first video frames, where the first video frame refers to two or more first video frames.

Figure 6:
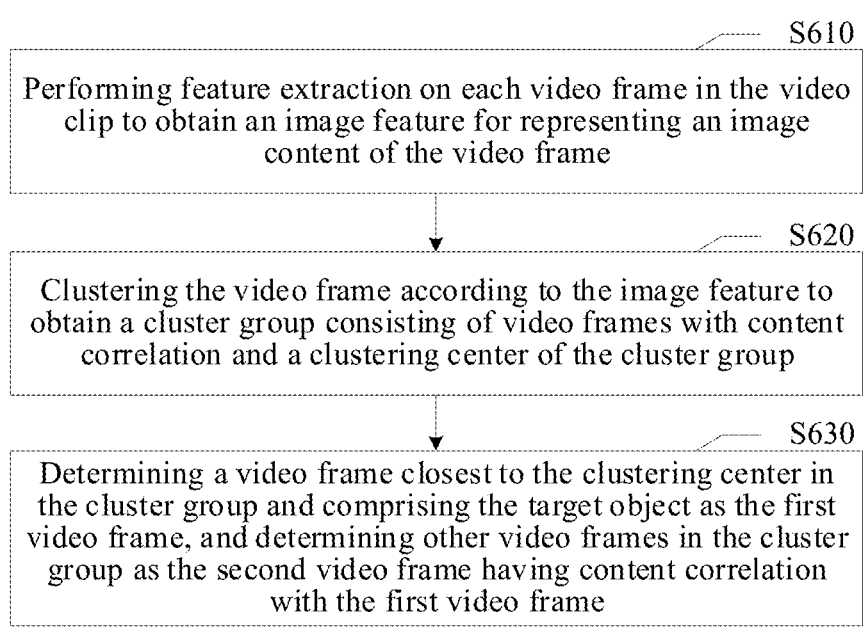
FIG. 6 exemplarily shows a flowchart of steps of extracting a video frame in an embodiment of this disclosure.

FIG. 6 exemplarily shows a flowchart of steps of extracting a video frame in an embodiment of this disclosure. As shown in FIG. 6, on the basis of the embodiments above, in step S520, extracting from the video clip a first video frame including the target object and a second video frame having content correlation with the first video frame may include step S610 and step S630 as follows:

Step S610: performing feature extraction on each video frame in the video clip to obtain an image feature for representing an image content of the video frame.

The video feature may be a feature vector with a specified length of time for representing an image content of the video frame, for example, a corresponding feature value can be extracted based on a color histogram of the video frame.

Step S620: clustering the video frame according to the image feature to obtain a cluster group consisting of video frames with content correlation and a clustering center of the cluster group.

During clustering, first, the several number of clustering centers can be randomly selected, and distances (e.g., the vector distance) between the image feature and each clustering center are respectively calculated; then the image feature is divided to the clustering center closest thereto to complete the division of the image feature, and then multiple cluster groups in the same number of the clustering centers are obtained. According to an average value of each image feature in the cluster group, a new clustering center of each cluster group can be re-determined. On this basis, steps of distance calculation and division of the image feature and clustering center are continuously repeated, to obtain multiple cluster groups when a cluster stop condition is met finally, and the clustering center of each cluster group can be determined.

Step S630: determining a video frame closest to the clustering center in the cluster group and comprising the target object as the first video frame, and determining other video frames in the cluster group as the second video frame having content correlation with the first video frame.

Each cluster group includes multiple video frames, where a video frame closest to the clustering center and including the target object can be selected as the first video frame, and other video frames except the first video frame are determined as the second video frame having content correlation with the first video frame.

In an embodiment of this disclosure, a video frame located at a specified position in the video clip can be directly used as the first video frame. For example, the first frame, the last frame, or a certain frame in the middle of the video clip can be used as the first video frame, and other video frames except for this one are used as the second video frame.

In an embodiment of this disclosure, the first video frame can also be determined based on motion analysis of the target object. For example, an luminous flux of the target object can be analyzed in the video clip, each time the video frame with the minimal optical stream moving times in the video clip is selected as the first video frame, and other video frames except for this one are used as the second video frame.

In step S530, key point detection is performed on the video frames, to obtain key points of the target object in the video frames, and the key points are used for representing a motion pose of the target object in the video frames. For example, key point detection is performed on the first video frame and the second video frame, to obtain key points of the object in the first video frame and the second video frame. The key points representing positions of the object in the first and second video frames.

In an embodiment of this disclosure, the target object is a face, and thus the corresponding key points may be face key points.

In an embodiment of this disclosure, the method for performing key point detection on the video frame may include: inputting the video frame into a pre-trained target object recognition model; and performing key point detection on the target object in the video frame through the target object recognition model, to obtain first key points (overall key points) for representing an overall motion pose of the target image and second key points (region key points) for representing a target region motion pose in the target object.

In an embodiment of this disclosure, the target object recognition model can be a face recognition model, based on which, the face key points in each video frame can be detected. For example, the first key points for representing an overall motion pose of the face can be, for example, one or more key points distributed near an edge of the face. This part of the first key points can be used for capturing an overall motion pose of the head of a character, such as turning the head, lowering the head, and raising the head. The target region located inside the face, for example, can be the region where the eyes, mouth, nose, and so on are located. The second key points for representing the motion pose of the target region inside the face can be the key points for accurately describing the motion poses of the five sense organs on the face distributed in a concentrated manner at the positions of the eyes, mouth, nose, and so on. For example, they can be used for representing motion poses such as the opening and closing of the eyes and the opening and closing of the mouth.

Figure 7:
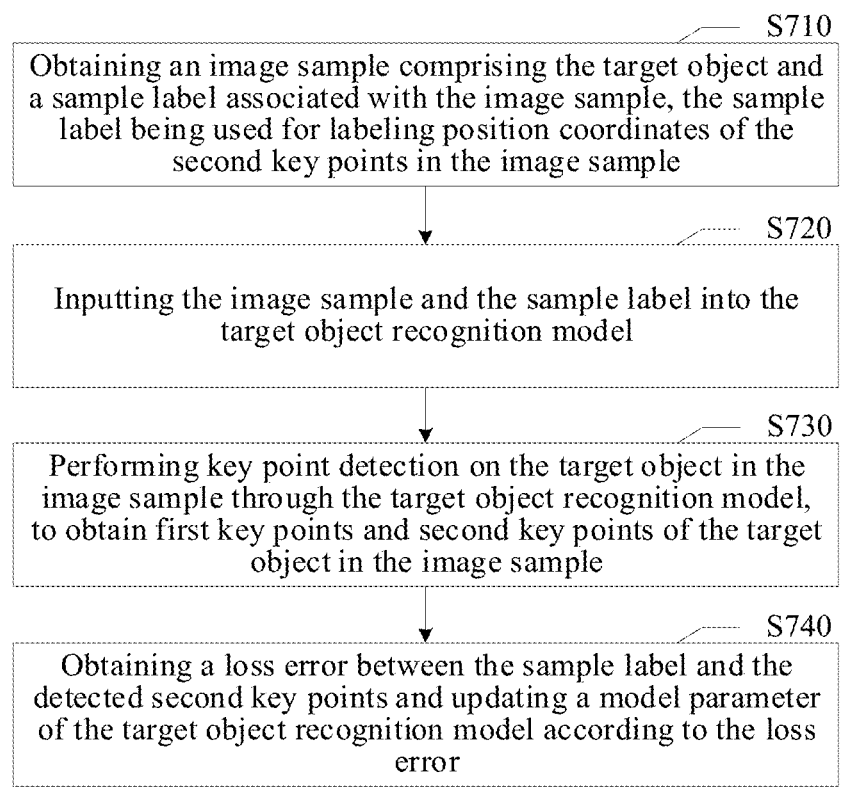
FIG. 7 exemplarily shows a flowchart of steps of performing model training on a target object recognition model based on semi-supervised learning in an embodiment of this disclosure.

FIG. 7 exemplarily shows a flowchart of steps of performing model training on a target object recognition model based on semi-supervised learning in an embodiment of this disclosure. As shown in FIG. 7, on the basis of the embodiments above, the method for performing model training on the target object recognition model may include steps S710 to step S740 as follows.

Step S710: obtaining an image sample comprising the target object and a sample label associated with the image sample, the sample label being used for labeling position coordinates of the second key points in the image sample.

The image sample can be a face image including a face, and the sample label is used for representing position coordinates of several key points in five sense organ regions in the face.

Step S720: inputting the image sample and the sample label into the target object recognition model.

The target object recognition model can be a face recognition model used for face detection. The face image and some face key point labels with annotations are together input into the face recognition model.

Step S730: performing key point detection on the target object in the image sample through the target object recognition model, to obtain first key points and second key points of the target object in the image sample.

The face recognition model can detect the key points of the face in the image, and the detected face key points can be divided into two categories, one of which is the second key point, i.e., the key points in the five sense organ regions with position annotations, and the other one of which is the first key point without position annotations.

Step S740: obtaining a loss error between the sample label and the detected second key points and updating a model parameter of the target object recognition model according to the loss error.

According to the position of the pre-labeled second key point in the image and the distribution position of the second key point actually output by a template object, the loss error can be determined. Performing reverse propagation based on the loss error, an error gradient of each weight in each network layer in the target object recognition model can be determined, so as to update, based on the error gradient, some or all the weights in the network layers.

Figure 16:
FIG. 16 exemplarily shows a schematic diagram of distribution of unsupervised key points and supervised key points in a face.

When the existing face key point detection algorithm dlib is applied to the key points obtained in the video, unstable situations such as jitter would always occur; and whether the key point information of a drive frame is accurate would further affect a final face generation effect to a large extent. To ensure the stability of the key point detection at the time domain, a mode of combining unsupervised and supervised is adopted herein. In the embodiments of this disclosure, 2N key points are detected, with N unsupervised key points and N supervised key points. The unsupervised part aims at capturing an overall motion pose of the head, such as turning the head, lowering the head, and raising the head, as 5 white key points in FIG. 16. The supervised key points are mainly focused around the eyes and mouth, as 5 black key points in FIG. 16, and aim at accurately describing the motion state of the five sense organs, such as opening and closing of the eyes, and the motion of the mouth, to generate a face with natural facial expressions at the decoding end.

In the embodiment of this disclosure, N unsupervised key points and N supervised key points are learned together, and key point coordinates are obtained as labels by using the face key point detection algorithm to supervise N key points in 2N, which can effectively reduce the instability of these N supervised key points in the time domain.

In step S540, the first video frame, the key points in the first video frame, and the key points in the second video frame are coded to obtain image coding data. For example, the first video frame, the key points in the first video frame, and the key points in the second video frame are encoded to obtain coded image data that does not include the second video frame.

The method for coding the first video frame can adopt the video coding method provided by the embodiments above and is omitted for briefness.

In one embodiment of this disclosure, network detection can be first performed on the data transmission network for transmitting the video clip to determine the network type and network signal strength of the data transmission network, and then according to the network type and network signal strength, whether the data transmission network is a weak network is determined. If the data transmission network is a weak network, the first video frame, the key points in the first video frame, and the key points in the second video frame are coded. If the data transmission network is not a weak network, the first video frame, the second video frame, the key points in the first video frame, and the key points in the second video frame are coded.

In addition to wired communication links, the type of data transmission network also includes multiple connection modes of 2G/3G/Edge/4G/5G/Wi-Fi and other mobile communication networks. Different protocols, different standards, and different rates enrich the running scenes of mobile applications. From the perspective of network transmission, there are far more scenes that require additional attention, in addition to network disconnection, network failure, and the like. In an embodiment of this disclosure, the weak network refers to a network with the network signal strength lower than a strength threshold. The strength threshold refers to a preset threshold associated with the network type. Different network types can be associated to same or different strength thresholds. For example, when detecting that the network type of the data transmission network is a 4G network, the corresponding strength threshold is obtained as −50 dbm. If the network signal strength of the data transmission network is less than −50 dbm, it can be determined that the network is a weak network. If the network signal strength of the data transmission network is greater than −50 dbm, it can be determined that the network is not a weak network.

In an embodiment of this disclosure, one or more parameters in network bandwidth, packet loss rate, or network delay can also be used as network quality parameters, and the network with the network quality parameters lower than parameter thresholds is determined as a weak network. For example, the network delay is used as a network quality parameter, and when the network delay of the data transmission network is greater than 300 ms, it can be determined that the network is a weak network. For another example, the packet loss rate is used as a network quality parameter, and when the packet loss rate of the data transmission network is greater than 10%, it can be determined that the network is a weak network.

In an embodiment of this disclosure, when the data transmission network is determined as a weak network, i.e., the network quality is weak, it can be selected to only code the first video frame, the key points in the first video frame, and the key points in the second video frame, so as to greatly reduce the coding data amount, reduce the coding information complexity, and improve coding efficiency and data transmission efficiency. Moreover, when it is determined that the data transmission network is not a weak network, i.e., the network quality is good, it can be selected to code the first video frame, the second video frame, the key points in the first video frame, and the key points in the second video frame, so as to further improve the definition of the video image under the condition that the network bandwidth pressure is not great.

In step S550, the image coding data is transmitted to a decoding end so that the decoding end generates a reconstruction image of the second video frame according to the image coding data. For example, the coded image data is transmitted to a decoder configured to reconstruct the second video frame according to the coded image data.

In an embodiment of this disclosure, before transmitting a video to the decoding end by the coding end, the image coding data can be encrypted based on an encryption algorithm, so as to improve safety and reliability of data transmission. After transmitting to the decoding end, the encrypted coding data is first decrypted by the decoding end, and further decoded after the decryption to obtain data carried therein, such as the first video frame, the key points in the first video frame, and the key points in the second video frame. On the basis of obtaining the corresponding data upon decoding, the decoding end may carry out image reconstruction to generate the reconstruction image of the second video frame.

Figure 8:
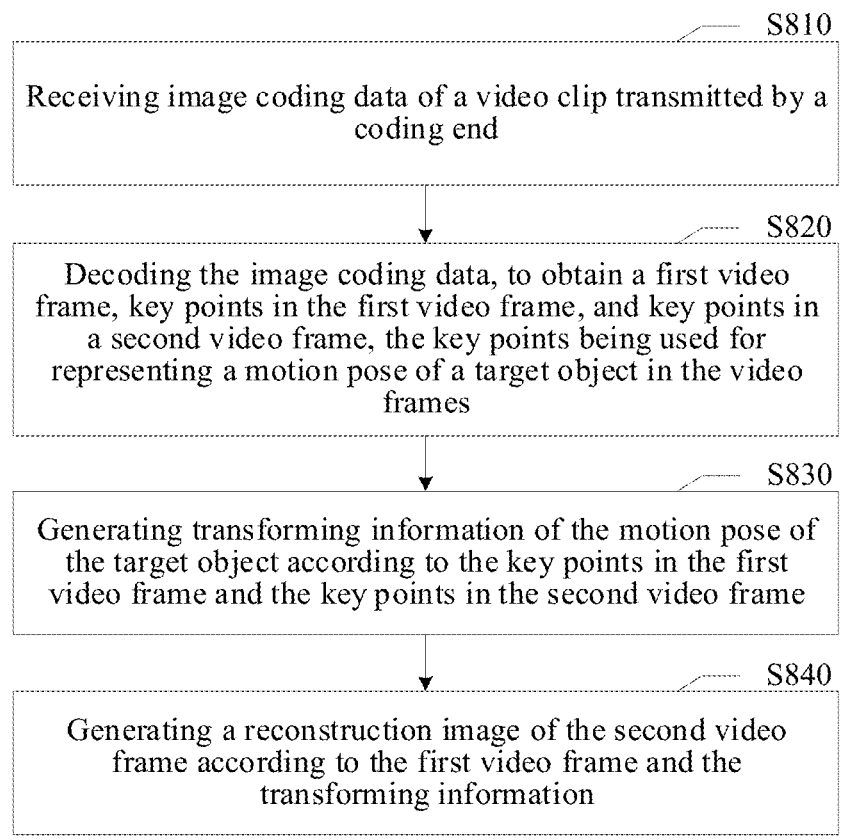
FIG. 8 exemplarily shows a flowchart of steps of an image processing method at a decoding end in an embodiment of this disclosure.

FIG. 8 exemplarily shows a flowchart of steps of an image processing method at a decoding end of an embodiment of this disclosure. The image processing method can be executed by the decoder shown in FIG. 3. As shown in FIG. 8, the image processing method may include the following steps S810-S840.

In step S810, image coding data of a video clip transmitted by a coding end is received. For example, coded image data is received of a video clip transmitted by an encoder.

In an embodiment of this disclosure, the decoding end can receive the image coding data corresponding to one video clip transmitted by the coding end in real time. If the image coding data is data encrypted by the coding end based on an encryption key, the decoding end can decrypt the encrypted data according to a corresponding decryption key, to obtain original plaintext data.

In step S820, the image coding data is decoded, to obtain a first video frame, key points in the first video frame, and key points in a second video frame, and the key points are used for representing a motion pose of a target object in the video frames. For example, the coded image data is decoded to obtain a first video frame, key points in the first video frame, and key points in a second video frame not included in the coded image data received from the encoder. The key points representing positions of an object in the first and second video frames.

The method for decoding the image coding data can refer to the decoding method executed by the decoder in the embodiments above, and is omitted herein for briefness.

In step S830, transforming information of the motion pose of the target object is generated according to the key points in the first video frame and the key points in the second video frame. For example, transforming information of motion of the object is generated according to the key points in the first video frame and the key points in the second video frame.

In an embodiment of this disclosure, the transforming information of the motion pose of the target object includes a motion field between the first video frame and the second video frame; when a motion pose of the target object changes between two video frames, labeling the motion speed of each pixel point on the target object can obtain the corresponding motion field.

In an embodiment of this disclosure, the method of generating the transforming information of the motion pose of the target object according to the key points in the first video frame and the key points in the second video frame may include: generating a key point mapping relationship in one-to-one correspondence (one-to-one key point mapping relationship) between the key points in the first video frame and the key points in the second video frame; generating an affine transforming parameter of a neighborhood of each key point according to the key point mapping relationship; and performing optical flow estimation on the first video frame according to the affine change parameter, the key points in the first video frame, and the key points in the second video frame, to obtain a motion field between the first video frame and the second video frame.

The light and shade changes of an object in an image sequence are called an optical flow, and optical flow estimation is a method for inferring the moving speed and direction of an object by detecting changes of intensity of image pixel points over time. Based on the optical flow estimation of the first video frame, in the embodiment of this disclosure, the motion field used for describing the motion state of the target object can be obtained.

In step S840, a reconstruction image of the second video frame is generated according to the first video frame and the transforming information. For example, the second video frame is reconstructed according to the first video frame and the transforming information.

Figure 9:
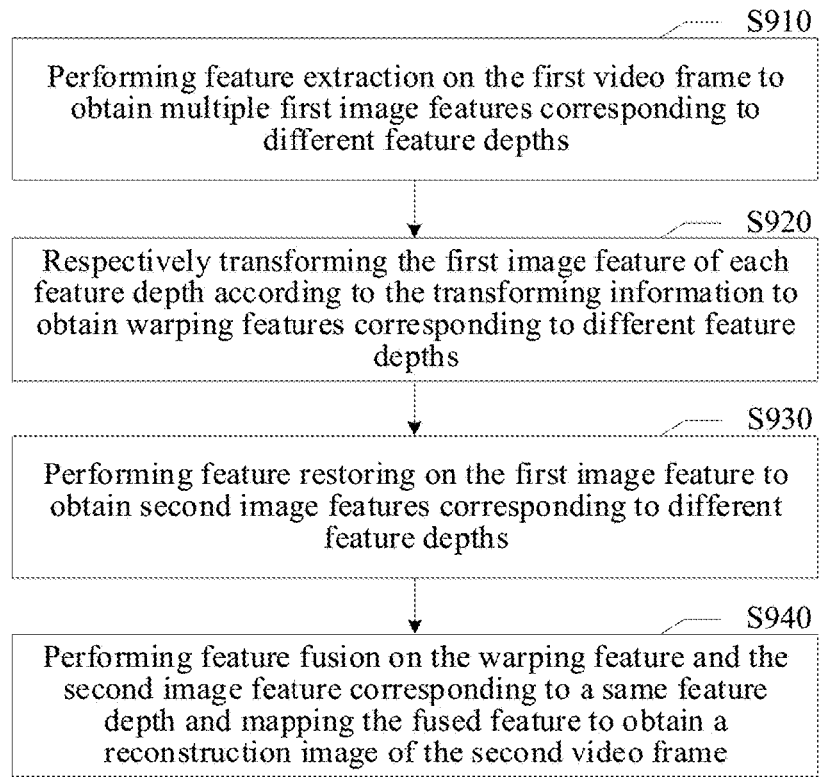
FIG. 9 exemplarily shows a flowchart of steps of image reconstruction in an embodiment of this disclosure.

FIG. 9 exemplarily shows a flowchart of steps of image reconstruction in an embodiment of this disclosure. As shown in FIG. 9, on the basis of the embodiments above, in step S840, generating a reconstruction image of the second video frame according to the first video frame and the transforming information may include the following steps S910-S940.

Step S910: performing feature extraction on the first video frame to obtain multiple first image features corresponding to different feature depths.

In an embodiment of this disclosure, a pre-trained feature extraction network can be used for extracting a feature of the first video frame. The feature extraction network can include multiple feature extraction layers with continuous distribution and gradually deepening features. After the first video frame is input into the feature extraction network, multiple first image features corresponding to different feature depths can be extracted from each feature extraction layer in sequence.

Step S920: respectively transforming the first image feature of each feature depth according to the transforming information to obtain warping features (warped features) corresponding to different feature depths;

transforming the first image feature extracted at each feature depth according to the transforming information to obtain the corresponding warping feature at each feature depth. In an embodiment of this disclosure, the transforming information can be a transformation matrix generated based on the motion field. The first image feature is an extracted feature map. The corresponding warping feature can be obtained by a matrix operation based on the feature map and the transformation matrix.

Step S930: performing feature restoring on the first image feature to obtain second image features corresponding to different feature depths.

Corresponding to the feature extraction network, in the embodiment of this disclosure, the feature restoration of the first image feature of each feature depth can be carried out through the reverse-configured feature restoration network. One corresponding second image feature at each feature depth can be restored.

Step S940: performing feature fusion on the warping feature and the second image feature corresponding to a same feature depth and mapping the fused feature to obtain a reconstruction image of the second video frame.

The method of performing feature fusion on the warping feature and the second image feature can be summing corresponding dimension feature values directly, or calculating an average value of the corresponding dimension feature values.

In an embodiment of this disclosure, upon feature fusion, the fused feature can be respectively mapped through multiple output networks having different network scales to obtain multiple reconstruction images of the second video frame, the multiple reconstruction images having different image resolution ratios. For example, the resolution of the first video frame is 256×256. After image reconstruction in the embodiment of this disclosure, the reconstruction image of the second video frame with the same resolution of 256×256 is obtained. In addition, by configuring multiple output networks, in the embodiment of this disclosure, the reconstruction image of the second video frame with the resolution of 512×512 can also be obtained at the same time to meet video image display needs of different sizes.

Figure 10:
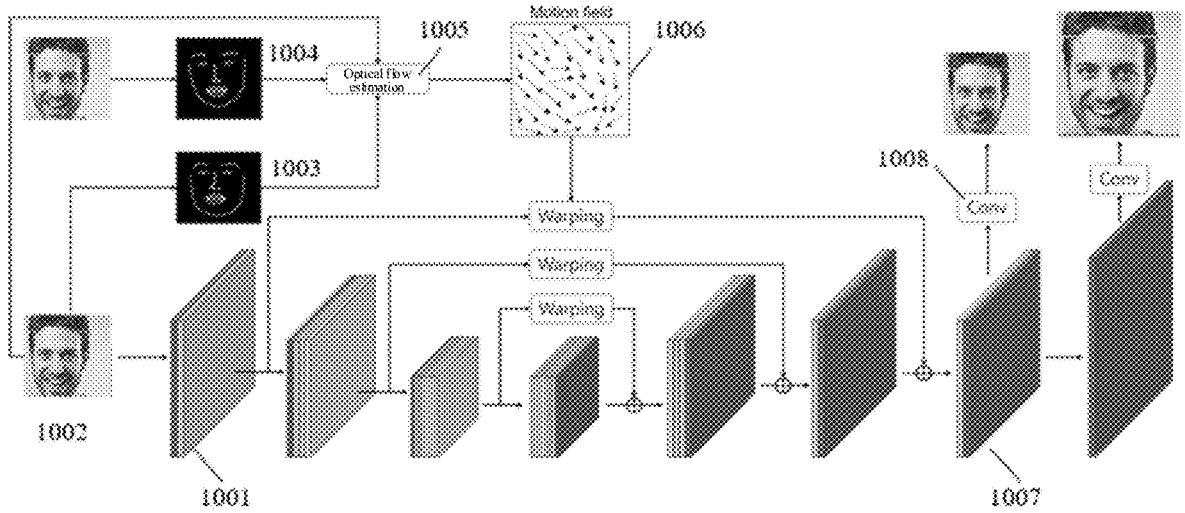
FIG. 10 exemplarily shows a network architecture diagram of an image generation network in an embodiment of this disclosure.

In an embodiment of this disclosure, image reconstruction can be conducted using a pre-trained image generation network. FIG. 10 exemplarily shows a network architecture diagram of an image generation network in an embodiment of this disclosure. The image generation network can include multiple parts, such as the feature extraction network, optical flow estimation network, feature recovery network, and feature output network.

Taking a convolutional neural network as an example, as shown in FIG. 10, the feature extraction network includes multiple convolutional layers 1001 which are deepened successively. After inputting the first video frame 1002, each convolutional layer 1001 convolves the input feature successively, so as to extract first image features corresponding to different feature depths.

The first video frame 1002, the key points 1003 of the first video frame, and the key point 1004 of the second video frame are input into the optical flow estimation network 1005. Based on the key points 1003 of the first video frame and the key points 1004 of the second video frame, affine transformation parameters of a key point neighborhood can be generated. Then, based on the key point information and affine transformation parameters, optical flow estimation can be carried out through the optical flow estimation network 1005 to generate a dense motion field 1006 from the first video frame to the second video frame.

Using the dense motion field 1006, the first image features with different feature depths can be subjected to feature warping to obtain corresponding warping features.

The feature recovery network includes multiple deconvolutional layers 1007 corresponding to different feature depths successively. Each deconvolutional layer 1007 deconvolves the input feature successively, so as to obtain second image features corresponding to different feature depths through recovery.

At the same feature depth, the warping feature and the second image feature can be fused to implement the image reconstruction from the first video frame to the second video frame.

The network output layer can be a full connection layer 1008 with different output dimensions. Based on the full connection layer 1008, the reconstructed reconstruction images corresponding to different image resolutions can be output.

In the embodiment of this disclosure, without changing a face scale of a reference frame, the image generation network can output reconstruction faces of different scales to meet the display requirements of different sizes. Since the semantic information based AI face coding solution is very sensitive to the face resolution, an overall complexity of the solution would also increase when the face resolution in a video conference is increased, and it is difficult to meet a low delay requirement of real-time video communications. With this regard, the default resolution of the reference frame at the coding end is 256×256 herein. At the decoding end, in addition to generating 256×256 drive frame faces, it can also output drive frame faces with higher resolution (such as 512×512). With this regard, a multi-scale output layer is used at an output end of a generation network, and multi-scale supervision signals (256 and 512 resolution dual supervision signals) are used during training. Thus, the face generation network in the embodiment of this disclosure can output multi-scale reconstruction faces at the decoding end without significantly increasing the time complexity. It is worth noting that under the optimization of multi-scale supervision, not only can 256×256 reference frames be used for generating 512×512 drive frames to reconstruct faces, but also the reconstruction faces at the scale of 256×256 are clearer than those obtained by single-scale supervision.

In an embodiment of this disclosure, although supervised key points are used herein to describe the mouth motion pose as far as possible, it is difficult to accurately describe the mouth motion pose due to the limited number of key points. It is considered that the video conference is generally accompanied by a speech signal, and the speech signal and the mouth motion of the face further have a relatively strong correlation. Therefore, the embodiment of this disclosure can be combined with the speech signals to repair the mouth in the generated face image, making the mouth pose more real and natural.

Figure 11:
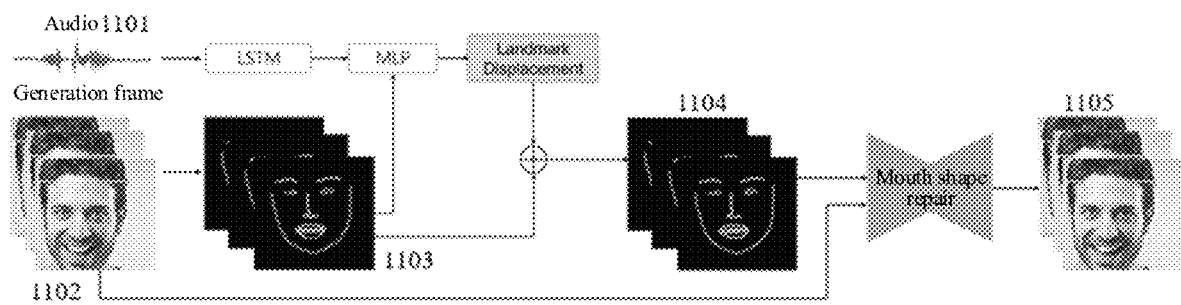
FIG. 11 exemplarily shows a principle diagram of repairing a reconstruction image based on audio data in an embodiment of this disclosure.

FIG. 11 exemplarily shows a principle diagram of repairing a reconstruction image based on audio data in an embodiment of this disclosure. As shown in FIG. 11, audio data 1101 associated with the image coding data can be obtained in embodiment of this disclosure. Feature extraction of the audio data 1101 can be carried out based on a Long And Short Term Memory Network (LSTM) or other network models to obtain corresponding audio features.

Key point detection is performed on the reconstruction image 1102 of the second video frame to obtain key points 1103 of the target object in the reconstruction image.

Key points of a target region located in the target object can be determined according to a distribution position of each key point 1103 in the reconstruction image. For example, the key points of the face mouth region can be determined.

Position correction is performed on the key points 1103 of the target region according to the audio data 1101 to obtain corrected key points 1104. In the embodiment of this disclosure, the pre-trained Multilayer Perception (MLP) model can be used for mapping the reconstructed key points and audio features, so as to obtain the key points after position correction.

Local image modification is performed on the reconstruction image 1102 according to the corrected key points 1104 to obtain a repaired reconstruction image 1105.

In one embodiment of this disclosure, the image generation network can be trained jointly by configuring the image determining network or the similarity determining network, so as to obtain the image generation network that can reconstruct the image clearly and accurately.

Figure 12:
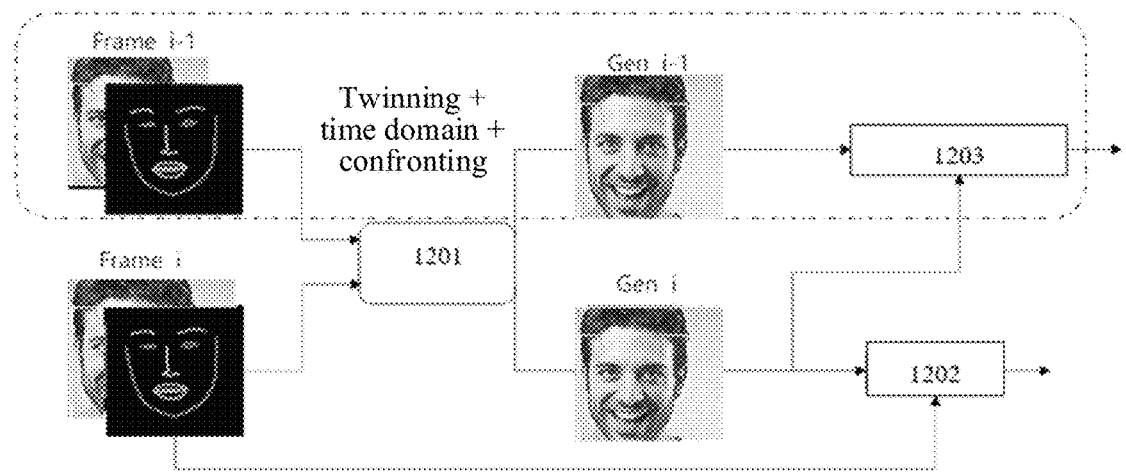
FIG. 12 exemplarily shows a network architecture of jointly training a model in an embodiment of this disclosure.

FIG. 12 exemplarily shows a network architecture of jointly training a model in an embodiment of this disclosure. As shown in FIG. 12, the network architecture as a whole includes an image generation network 1201, an image determining network 1202, and a similarity determining network 1203.

In one embodiment of this disclosure, the method for joint training of the image generation network 1201 and the image determining network 1202 may include the following contents.

First, a first image sample including the target object and a second image sample having content correlation with the first image sample can be obtained.

Key point detection is respectively performed on the first image sample (e.g., an (i−1)-th image frame Frame i−1) and the second image sample (e.g., an i-th image frame Frame i), to obtain first key points of the target object in the first image sample and second key points of the target object in the second image sample.

An image generation network 1201 for generating the reconstruction image according to an original image and an image determining network 1202 for determining whether an image is an original image or a reconstruction image are obtained.

The first image sample, the first key points, and the second key points are input into the image generation network 1201 to perform image reconstruction on the first image sample through the image generation network 1201 to obtain the reconstruction image Gen i of the second image sample.

The reconstruction image Gen i of the second image sample and the second image sample Frame i are respectively input into the image determining network 1202 to determine the input image through the image determining network 1202 to obtain determining information that the input image is an original image or a reconstruction image.

Network parameters of the image generation network and the image determining network are alternatively updated according to the determining information.

In one embodiment of this disclosure, the method for joint training of the image generation network 1201 and the similarity determining network 1203 may include the following contents.

A third image sample including the target object (e.g., an (i–1)-th image frame Frame i–1) and a fourth image sample having time correlation with the third image sample (e.g., an i-th image frame Frame i) are obtained.

Key point detection is respectively performed on the third image sample Frame i–1 and the fourth image sample Frame i, to obtain third key points of the target object in the third image sample Frame i–1 and fourth key points of the target object in the fourth image sample Frame i.

An image generation network 1201 for generating the reconstruction image according to an original image and a similarity determining network 1203 for determining similarity are obtained.

The third image sample Frame i–1, the fourth image sample Frame i, the third key points, and the fourth key points are input into the image generation network to perform image reconstruction on the third image sample and the fourth image sample respectively through the image generation network to obtain the reconstruction image of the third image sample and the reconstruction image of the fourth image sample.

The reconstruction image of the third image sample and the reconstruction image of the fourth image sample into the similarity determining network 1203 to determine the input image through the similarity determining network 1203 to obtain an image similarity between the reconstruction image of the third image sample and the reconstruction image of the fourth image sample.

Network parameters of the image generation network 1201 and the similarity determining network 1203 are updated according to the image similarity.

It should be noted that each step in the method of this disclosure is described in a specific order in the accompanying drawings; however, this does not request or imply that the steps are executed according to the specific order, or all shown steps are necessarily executed so as to implement a desired result. Additionally or alternatively, some steps may be omitted, a plurality of steps may be combined into one step for execution, and/or one step may be decomposed into a plurality of steps for execution, and the like.

The apparatus embodiments of this disclosure are introduced as follows and can be used for executing the image processing method in the embodiments above.

Figure 13:
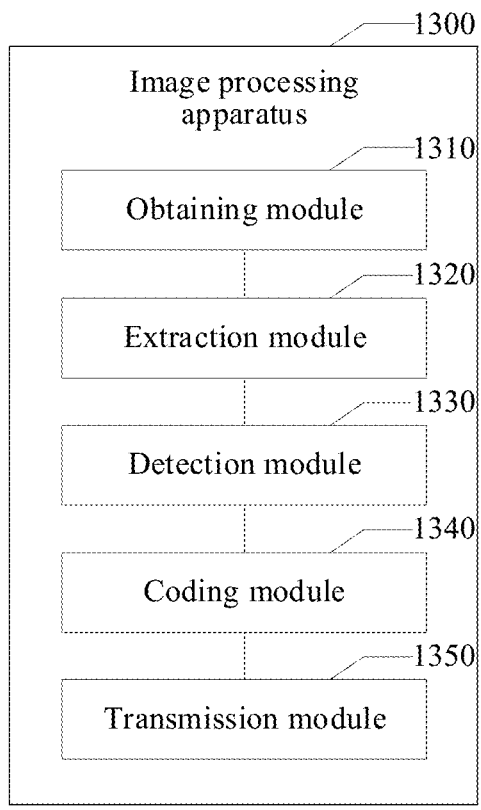
FIG. 13 exemplarily shows a structural block diagram of an image processing apparatus located at a decoding end provided by an embodiment of this disclosure.

FIG. 13 exemplarily shows a structural block diagram of an image processing apparatus located at a coding end provided by an embodiment of this disclosure. As shown in FIG. 13, an image processing apparatus 1300 includes:

an obtaining module 1310, configured to obtain a video clip to be transmitted, the video clip including multiple video frames; an extraction module 1320, configured to extract from the video clip a first video frame including the target object and a second video frame having content correlation with the first video frame; a detection module 1330, configured to perform key point detection on the video frames, to obtain key points of the target object in the video frames, the key points being used for representing a motion pose of the target object in the video frames; a coding module 1340, configured to encode the first video frame, the key points in the first video frame, and the key points in the second video frame to obtain image coding data; and a transmission module 1350, configured to transmit the image coding data to a decoding end so that the decoding end generates a reconstruction image of the second video frame according to the image coding data.

In some embodiments of this disclosure, based on the embodiments above, the detection module 1330 is configured to: input the video frame into a pre-trained target object recognition model; and perform key point detection on the target object in the video frame through the target object recognition model, to obtain first key points for representing an overall motion pose of the target image and second key points for representing a target region motion pose in the target object.

In some embodiments of this disclosure, based on the embodiments above, the image processing apparatus 1300 further includes: a sample obtaining module, configured to obtain an image sample comprising the target object and a sample label associated with the image sample, the sample label being used for labeling position coordinates of the second key points in the image sample; a sample inputting module, configured to input the image sample and the sample label into the target object recognition model; a sample detection module, configured to perform key point detection on the target object in the image sample through the target object recognition model, to obtain first key points and second key points of the target object in the image sample; and a parameter updating module, configured to obtain a loss error between the sample label and the detected second key points and update a model parameter of the target object recognition model according to the loss error.

In some embodiments of this disclosure, based on the embodiments above, the extraction module 1320 is configured to: perform feature extraction on each video frame in the video clip to obtain an image feature for representing an image content of the video frame; cluster the video frame according to the image feature to obtain a cluster group consisting of video frames with content correlation and a clustering center of the cluster group; and determine a video frame closest to the clustering center in the cluster group and comprising the target object as the first video frame, and determine other video frames in the cluster group as the second video frame having content correlation with the first video frame.

In some embodiments of this disclosure, based on the embodiments above, the coding module 1340 is configured to: perform network detection on the data transmission network for transmitting the video clip to determine the network type and network signal strength of the data transmission network; according to the network type and network signal strength, determine whether the data transmission network is a weak network; code the first video frame, the key points in the first video frame, and the key points in the second video frame if the data transmission network is a weak network; code the first video frame, the second video frame, the key points in the first video frame, and the key points in the second video frame if the data transmission network is not a weak network.

Figure 14:
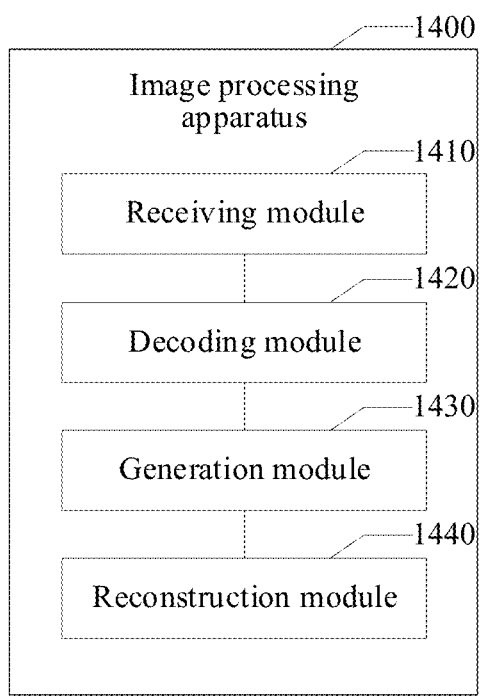
FIG. 14 exemplarily shows a structural block diagram of an image processing apparatus located at a coding end provided by an embodiment of this disclosure.

FIG. 14 exemplarily shows a structural block diagram of an image processing apparatus located at a decoding end provided by an embodiment of this disclosure. As shown in FIG. 14, an image processing apparatus 1400 includes: a receiving module 1410, configured to receive image coding data of a video clip transmitted by a coding end; a decoding module 1420, configured to decode the image coding data, to obtain a first video frame, key points in the first video frame, and key points in a second video frame, the key points being used for representing a motion pose of a target object in the video frames; a generation module 1430, configured to generate transforming information of the motion pose of the target object according to the key points in the first video frame and the key points in the second video frame; and a reconstruction module 1440, configured to generate a reconstruction image of the second video frame according to the first video frame and the transforming information.

In some embodiments of this disclosure, based on the embodiments above, the transforming information of the motion pose of the target object includes a motion field between the first video frame and the second video frame. The generation module 1430 is configured to: generate a key point mapping relationship in one-to-one correspondence between the key points in the first video frame and the key points in the second video frame; generate an affine transforming parameter of a neighborhood of each key point according to the key point mapping relationship; and perform optical flow estimation on the first video frame according to the affine transforming parameter, the key points in the first video frame, and the key points in the second video frame, to obtain a motion field between the first video frame and the second video frame.

In some embodiments of this disclosure, based on the embodiments above, the reconstruction module 1440 is configured to: perform feature extraction on the first video frame to obtain multiple first image features corresponding to different feature depths; respectively transform the first image feature of each feature depth according to the transforming information to obtain warping features corresponding to different feature depths; perform feature restoring on the first image feature to obtain second image features corresponding to different feature depths; and perform feature fusion on the warping feature and the second image feature corresponding to a same feature depth and mapping the fused feature to obtain a reconstruction image of the second video frame.

In some embodiments of this disclosure, based on the embodiments above, the reconstruction module 1440 is also configured to: respectively map the fused feature through multiple output networks having different network scales to obtain multiple reconstruction images of the second video frame, the multiple reconstruction images having different image resolution ratios.

In some embodiments of this disclosure, based on the embodiments above, the image processing apparatus 1400 further includes: an audio obtaining module, configured to obtain audio data associated with the image coding data; an image detection module, configured to perform key point detection on the reconstruction image of the second video frame to obtain key points of the target object in the reconstruction image; a key point determining module, configured to determine key points of a target region located in the target object according to a distribution position of each key point in the reconstruction image; a position correction module, configured to perform position correction on the key points of the target region according to the audio data to obtain corrected key points; and an image repairing module, configured to perform local image modification on the reconstruction image according to the corrected key points to obtain a repaired reconstruction image.

In some embodiments of this disclosure, based on the embodiments above, the image processing apparatus 1400 further includes: a first sample obtaining module, configured to obtain a first image sample comprising the target object and a second image sample having content correlation with the first image sample; a first sample detection module, configured to respectively perform key point detection on the first image sample and the second image sample, to obtain first key points of the target object in the first image sample and second key points of the target object in the second image sample; a first network obtaining module, configured to obtain an image generation network for generating the reconstruction image according to an original image and an image determining network for determining whether an image is an original image or a reconstruction image; a first image reconstruction module, configured to input the first image sample, the first key points, and the second key points into the image generation network to perform image reconstruction on the first image sample through the image generation network to obtain the reconstruction image of the second image sample; an image determining module, configured to respectively input the reconstruction image of the second image sample and the second image sample into the image determining network to determine the input image through the image determining network to obtain determining information that the input image is an original image or a reconstruction image; and a first parameter updating module, configured to alternatively update network parameters of the image generation network and the image determining network according to the determining information.

In some embodiments of this disclosure, based on the embodiments above, the image processing apparatus 1400 further includes: a second image sample obtaining module, configured to obtain a third image sample comprising the target object and a fourth image sample having time correlation with the third image sample; a second sample detection module, configured to respectively perform key point detection on the third image sample and the fourth image sample, to obtain third key points of the target object in the third image sample and fourth key points of the target object in the fourth image sample; a second model obtaining module, configured to obtain an image generation network for generating the reconstruction image according to an original image and a similarity determining network for determining similarity; a second image reconstruction module, configured to input the third image sample, the fourth image sample, the third key points, and the fourth key points into the image generation network to perform image reconstruction on the third image sample and the fourth image sample respectively through the image generation network to obtain the reconstruction image of the third image sample and the reconstruction image of the fourth image sample; a similarity determining module, configured to input the reconstruction image of the third image sample and the reconstruction image of the fourth image sample into the similarity determining network to determine the input image through the similarity determining network to obtain an image similarity between the reconstruction image of the third image sample and the reconstruction image of the fourth image sample; and a second parameter updating module, configured to update network parameters of the image generation network and the similarity determining network according to the image similarity.

Specific details of the image processing apparatus provided in each embodiment of this disclosure are described in detail in the corresponding method embodiment and are omitted for conciseness.

Figure 15:
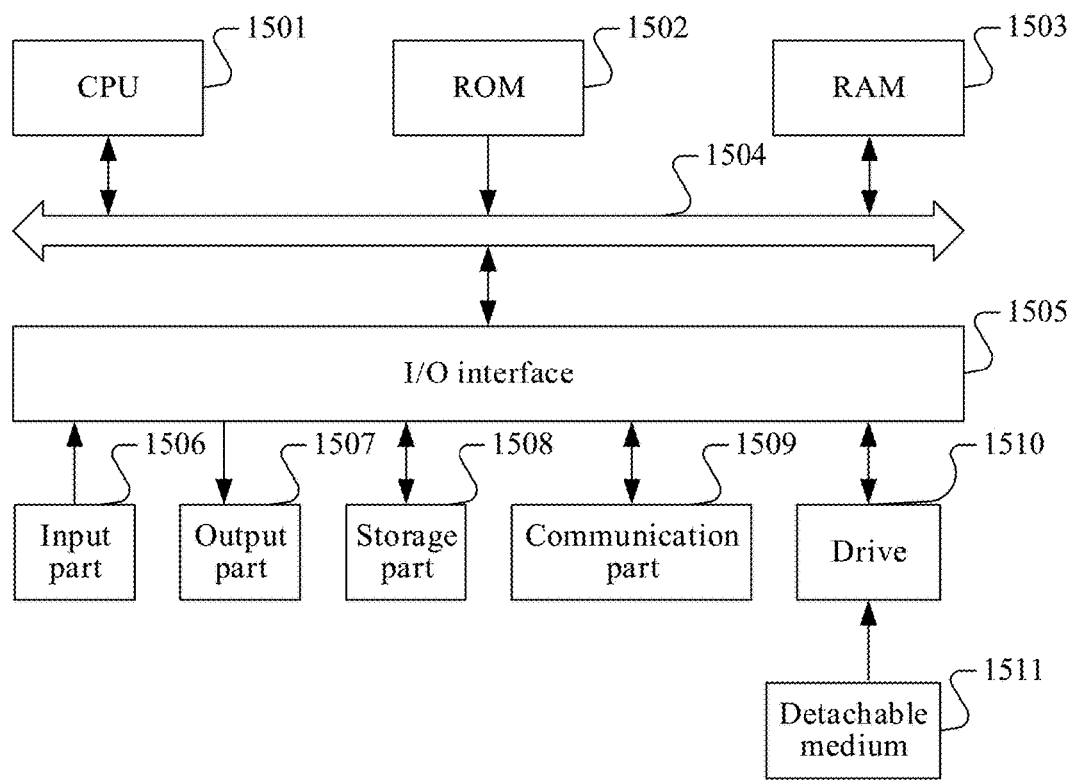
FIG. 15 exemplarily shows a structural block diagram of a computer system adapted to an electronic device for implementing an embodiment of this disclosure.

FIG. 15 exemplarily shows a structural block diagram of a computer system for an electronic device for implementing an embodiment of this disclosure.

It should be noted that the computer system 1500 of the electronic device shown in FIG. 15 is only an example, and should not bring any limitation to the function and use ranges of the embodiment of this disclosure.

As shown in FIG. 15, the computer system 1500 includes a Central Processing Unit (CPU) 1501 (processing circuitry), which can execute various proper actions and processing according to programs stored in a Read-Only Memory (ROM) 1502 or programs loaded from a storage part 1508 into a Random Access Memory (RAM) 1503 (non-transitory computer-readable storage medium). The RAM 1503 further stores various programs and data required by system operations. The CPU 1501, ROM 1502, and RAM 1503 are connected to each other through a bus 1504. An Input/Output interface 1505 (i.e., an I/O interface) is also connected to the bus 1504.

The following members are connected to the I/O interface 1505: an input part 1506 including a keyboard and a mouth; an output part 1507 including, such as a Cathode Ray Tube (CRT), a Liquid Crystal Display (LCD), and a loudspeaker; a storage part 1508 including a hard disk; and A communication part 1509 including, for example, an LAN card, a modem, and other network interface cards. The communication part 1509 performs communication processing by using a network such as the Internet. A drive 1510 is also connected to the I/O interface 1505 as required. A detachable medium 1511, such as a magnetic disk, an optical disc, photomagnetic disk, and a semiconductor memory, are installed on the drive 1510 as required, so that computer programs read from it can be installed into the storage part 1508 as required.

In particular, according to the embodiments of this disclosure, the process described in each method flowchart can be implemented as a computer software program. For example, this embodiment of this disclosure includes a computer program product, the computer program product includes a computer program carried on a computer-readable medium, and the computer program includes program code used for performing the methods shown in the flowcharts. In such embodiments, the computer program can be downloaded and installed from the network through the communication part 1509 and/or can be installed from the detachable medium 1511. When executed by the CPU 1501, the computer program executes various functions defined in the system of this disclosure.

It should be noted that the computer-readable medium shown in the embodiment of this disclosure may be a computer-readable signal medium, or a computer-readable storage medium, or any combination thereof. The computer-readable storage medium may be, for example, but is not limited to, an electric, magnetic, optical, electromagnetic, infrared, or semi-conductive system, apparatus, or component, or any combination of the above. More specific examples of the computer readable storage medium may include, but not limited to: an electrical connection with one or more wires, a portable computer disk, a hard disk, a RAM, a ROM, an Erasable Programmable Read Only Memory (EPROM), a flash memory, an optical fiber, a portable Compact Disc Read-Only Memory (CD-ROM), an optical memory, a magnetic memory, or any suitable combination thereof. In this disclosure, the computer-readable storage medium may be any tangible medium containing or storing a program, and the program may be used by or used in combination with an instruction execution system, an apparatus, or a device. Moreover, in this disclosure, the computer-readable signal medium may include a data signal propagated in a baseband or as part of a carrier, where a computer-readable program code is carried. A data signal propagated in such a way may assume a plurality of forms, including, but not limited to, an electromagnetic signal, an optical signal, or any appropriate combination thereof. The computer-readable signal medium may also be any computer-readable medium except the computer-readable storage medium. The computer-readable storage medium may send, propagate, or transmit a program intended for use by, or in combination with, an instruction execution system, apparatus, or device. The program codes included on the computer readable medium may be transmitted by any proper medium, including, but not limited to: wireless, wired, and the like, or any proper combination thereof.

In an embodiment, a non-transitory computer-readable storage medium stores computer-readable instructions which, when executed by a computer device, cause the computer device to perform an image processing method that includes receiving coded image data of a video clip transmitted by an encoder, and decoding the coded image data to obtain a first video frame, key points in the first video frame, and key points in a second video frame not included in the coded image data received from the encoder. The key points represent positions of an object in the first and second video frames. The method further includes generating transforming information of motion of the object according to the key points in the first video frame and the key points in the second video frame, and reconstructing the second video frame according to the first video frame and the transforming information.

In an embodiment, a non-transitory computer-readable storage medium stores computer-readable instructions which, when executed by a computer device, cause the computer device to perform an image processing method that includes obtaining a video clip to be transmitted, the video clip including multiple video frames, and extracting from the video clip a first video frame including an object and a second video frame including the object. The method further includes performing key point detection on the first video frame and the second video frame, to obtain key points of the object in the first video frame and the second video frame. The key points represent positions of the object in the first and second video frame. The method further includes encoding the first video frame, the key points in the first video frame, and the key points in the second video frame to obtain coded image data that does not include the second video frame, and transmitting the coded image data to a decoder configured to reconstruct the second video frame according to the coded image data.

The flowcharts and block diagrams in the accompanying drawings illustrate possible system architectures, functions, and operations that may be implemented by a system, a method, and a computer program product according to various embodiments of this disclosure. In this regard, each box in a flowchart or a block diagram may represent a module, a program segment, or a part of code. The module, the program segment, or the part of code includes one or more executable instructions used for implementing designated logic functions. It should also be noted that in some alternative implementations, the functions labeled in the box can also occur in a different order from those labeled in the accompanying drawings. For example, actually two boxes shown in succession may be performed basically in parallel, and sometimes the two boxes may be performed in a reverse sequence. This is determined by a related function. It should also be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Although a plurality of modules or units of a device configured to perform actions are discussed in the foregoing detailed description, such division is not mandatory. Actually, according to the implementations of this disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this disclosure.

After considering the description disclosed herein, a person skilled in the art would easily conceive of other implementations of this disclosure. This disclosure aims at covering any variation, usage, or adaptive change of this disclosure; these variations, usages, or adaptive changes follow a general principle of this disclosure and include the common knowledge or common technical means in this technical field that are not disclosed in this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. An image processing method, comprising:
receiving coded video data of a video clip transmitted by an encoder;
decoding the coded video data to obtain (i) image data of a first video frame including a face, (ii) first key point data indicating face key points of the face in the first video frame, and (iii) second key point data indicating the face key points of the face in a second video frame, the face key points representing positions of the face in the first video frame and the second video frame;
generating transforming information of motion of the face according to the face key points in the first video frame and the face key points in the second video frame; and
reconstructing the second video frame based on whether image data of the second video frame is available from the coded video data, wherein the second video frame is reconstructed based on the first video frame and the transforming information, according to a determination that the image data of the second video frame is not available.

2. The method according to claim 1, wherein
the transforming information comprises a motion field between the first video frame and
the second video frame, wherein the motion field represents motion speed of each pixel of the face; and
the generating the transforming information comprises:
generating a one-to-one key point mapping relationship between the face key points in the first video frame and the face key points in the second video frame;
generating an affine transforming parameter of a neighbourhood of each face key point according to the key point mapping relationship; and
performing optical flow estimation on the first video frame according to the affine transforming parameter, the face key points in the first video frame, and the face key points in the second video frame, to obtain the motion field between the first video frame and the second video frame.

3. The method according to claim 1, wherein the reconstructing the second video frame comprises:
performing feature extraction on the first video frame to obtain multiple first image features corresponding to different feature depths;
respectively transforming a first image feature of each feature depth according to the transforming information to obtain warped features corresponding to each feature depth;
performing feature restoring on the first image feature of each feature depth to obtain second image features corresponding to each feature depth; and
performing feature fusion on a warped feature and a second image feature corresponding to a same feature depth and mapping the fused feature to reconstruct the second video frame.

4. The method according to claim 3, wherein the mapping the fused feature comprises:
respectively mapping the fused feature through multiple output networks having different network scales to obtain multiple reconstruction images of the second video frame, the multiple reconstruction images having different image resolution ratios.

5. The method according to claim 1, further comprising:
obtaining audio data associated with the coded video data;
performing key point detection on the reconstructed second video frame to obtain the face key points of the face in the reconstructed second video frame;

determining key points of a target region of the face according to a distribution position of each face key point in the reconstructed second video frame;

performing position correction on the key points of the target region according to the audio data to obtain corrected key points; and performing local image modification on the reconstructed second video frame according to the corrected key points to obtain a repaired reconstructed second video frame.

6. The method according to claim 1, further comprising:

obtaining a first image sample comprising the face and a second image sample comprising the face;

respectively performing key point detection on the first image sample and the second image sample, to obtain first face key points of the face in the first image sample and second face key points of the face in the second image sample;

obtaining an image generation network for reconstructing an image according to an original image and an image determining network for determining whether an image is an original image or a reconstructed image;

inputting the first image sample, the first face key points, and the second face key points into the image generation network to reconstruct the second image sample;

respectively inputting the reconstructed second image sample and the second image sample into the image determining network to determine whether each input image is an original image or a reconstructed image; and alternatively updating network parameters of the image generation network and the image determining network according to results of the determining.

7. The method according to claim 1, further comprising:

obtaining a third image sample comprising the face and a fourth image sample comprising the face;

respectively performing key point detection on the third image sample and the fourth image sample, to obtain third face key points of the face in the third image sample and fourth face key points of the face in the fourth image sample;

obtaining an image generation network for reconstructing an image according to an original image and a similarity determining network for determining similarity;

inputting the third image sample, the fourth image sample, the third face key points, and the fourth face key points into the image generation network to reconstruct the third image sample and the fourth image sample respectively to obtain a reconstructed third image sample and a reconstructed fourth image sample;

inputting the reconstructed third image sample and the reconstructed fourth image sample into the similarity determining network to determine an image similarity between the reconstructed third image sample and the reconstructed fourth image sample; and updating network parameters of the image generation network and the similarity determining network according to the image similarity.

8. A non-transitory computer-readable storage medium storing computer- readable instructions thereon, which, when executed by a computer system, cause the computer system to perform the method of claim 1.

9. An image processing method, comprising:

obtaining a video clip to be transmitted, the video clip comprising multiple video frames that include a face;

extracting, from the video clip, a first video frame of the multiple video frames including the face and a second video frame of the multiple video frames including the face;

performing key point detection on the first video frame and the second video frame, to obtain face key points in the first video frame and the face key points in the second video frame, the face key points representing positions of the face in the first video frame and the second video frame;

encoding image data of the first video frame, the face key points in the first video frame, and the face key points in the second video frame to obtain coded video data; and transmitting the coded video data to a decoder configured to reconstruct the second video frame based on the image data of the first video frame, the face key points in the first video frame, and the face key points in the second video frame based on image data of the second video frame being determined to be not available to the decoder.

10. The method according to claim 9, wherein the performing the key point detection comprises:

inputting the first video frame and the second video frame into a pre-trained face recognition model; and performing key point detection on the face in the first video frame and the second video frame through the face recognition model, to obtain, for each of the first video frame and the second video frame, overall face key points for representing an overall position of the face and region face key points for representing a position of a region of the face.

11. The method according to claim 10, further comprising:

obtaining an image sample comprising the face and a sample label associated with the image sample, the sample label labelling position coordinates of the region face key points in the image sample;

inputting the image sample and the sample label into the face recognition model;

performing key point detection on the face in the image sample through the face recognition model, to obtain overall face key points and region face key points of the face in the image sample; and obtaining a loss error between the sample label and the obtained region face key points and updating a model parameter of the face recognition model according to the loss error.

12. The method according to claim 9, wherein the extracting comprises:

performing feature extraction on each video frame in the video clip to obtain facial features representing content of the respective video frame;

clustering video frames in the video clip according to their respective facial features to obtain a cluster group of video frames with content correlation and a clustering center of the cluster group; and determining, as the first video frame, a video frame that includes the face and that is closest to the clustering center in the cluster group, and determining other video frames in the cluster group as the second video frame.

13. A non-transitory computer-readable storage medium storing computer- readable instructions thereon, which, when executed by a computer system, cause the computer system to perform the method of claim 9.

14. An image processing apparatus, comprising:
processing circuitry configured to
receive coded video data of a video clip transmitted by an encoder;
decode the coded video data, to obtain (i) image data of a first video frame including a face, (ii) first key point data indicating face key points of the face in the first video frame, and (iii) second key point data indicating the face key points of the face in a second video frame, the face key points representing positions of the face in the first video frame and the second video frame;
generate transforming information of motion of the face according to the face key points in the first video frame and the face key points in the second video frame; and
reconstruct the second video frame based on whether image data of the second video frame is available from the coded video data, wherein
the second video frame is reconstructed based on the first video frame and the transforming information, according to a determination that the image data of the second video frame is not available.

15. The apparatus according to claim 14, wherein
the transforming information comprises a motion field between the first video frame and
the second video frame, wherein the motion field represents motion speed of each pixel of the face; and
the processing circuitry is further configured to:
generate a one-to-one key point mapping relationship between the face key points in the first video frame and the face key points in the second video frame;
generate an affine transforming parameter of a neighborhood of each face key point according to the key point mapping relationship; and
perform optical flow estimation on the first video frame according to the affine transforming parameter, the face key points in the first video frame, and the face key points in the second video frame, to obtain the motion field between the first video frame and the second video frame.

16. The apparatus according to claim 14, wherein the processing circuitry is further configured to:
perform feature extraction on the first video frame to obtain multiple first image features corresponding to different feature depths;
respectively transform a first image feature of each feature depth according to the transforming information to obtain warped features corresponding to each feature depth;
perform feature restoring on the first image feature of each feature depth to obtain second image features corresponding to each feature depth; and
perform feature fusion on a warped feature and a second image feature corresponding to a same feature depth and mapping the fused feature to reconstruct the second video frame.

17. The apparatus according to claim 16, wherein the processing circuitry is further configured to:
respectively map the fused feature through multiple output networks having different network scales to obtain multiple reconstruction images of the second video frame, the multiple reconstruction images having different image resolution ratios.

18. The apparatus according to claim 14, wherein the processing circuitry is further configured to:
obtain audio data associated with the coded video data;
perform key point detection on the reconstructed second video frame to obtain the face key points of the face in the reconstructed second video frame;
determine key points of a target region of the face according to a distribution position of each face key point in the reconstructed second video frame;
perform position correction on the key points of the target region according to the audio data to obtain corrected key points; and
perform local image modification on the reconstructed second video frame according to the corrected key points to obtain a repaired reconstructed second video frame.

19. The apparatus according to claim 14, wherein the processing circuitry is further configured to:
obtain a first image sample comprising the face and a second image sample comprising the face;
respectively perform key point detection on the first image sample and the second image sample, to obtain first face key points of the face in the first image sample and second face key points of the face in the second image sample;
obtain an image generation network for reconstructing an image according to an original image and an image determining network for determining whether an image is an original image or a reconstructed image;
input the first image sample, the first face key points, and the second face key points into the image generation network to reconstruct the second image sample;
respectively input the reconstructed second image sample and the second image sample into the image determining network to determine whether each input image is an original image or a reconstructed image; and
alternatively update network parameters of the image generation network and the image determining network according to results of the determining.

20. The apparatus according to claim 14, wherein the processing circuitry is further configured to:
obtain a third image sample comprising the face and a fourth image sample comprising the face;
respectively perform key point detection on the third image sample and the fourth image sample, to obtain third face key points of the face in the third image sample and fourth face key points of the face in the fourth image sample;
obtain an image generation network for reconstructing an image according to an original image and a similarity determining network for determining similarity;
input the third image sample, the fourth image sample, the third face key points, and the fourth face key points into the image generation network to reconstruct the third image sample and the fourth image sample respectively to obtain a reconstructed third image sample and a reconstructed fourth image sample;
input the reconstructed third image sample and the reconstructed fourth image sample into the similarity determining network to determine an image similarity between the reconstructed third image sample and the reconstructed fourth image sample; and
updating network parameters of the image generation network and the similarity determining network according to the image similarity.

* * * * *